(12) United States Patent
Lees

(10) Patent No.: US 6,422,527 B1
(45) Date of Patent: Jul. 23, 2002

(54) HOUSING SUPPORT

(75) Inventor: John David Lees, Huddersfield (GB)

(73) Assignee: Brook Motors Limited, London (GB)

( * ) Notice: Subject to any disclaimer, the term of this patent is extended or adjusted under 35 U.S.C. 154(b) by 0 days.

(21) Appl. No.: 09/623,131

(22) PCT Filed: Feb. 12, 1999

(86) PCT No.: PCT/GB99/00449

§ 371 (c)(1),
(2), (4) Date: Nov. 13, 2000

(87) PCT Pub. No.: WO99/44270

PCT Pub. Date: Sep. 2, 1999

(30) Foreign Application Priority Data

Feb. 28, 1998 (GB) .............................................. 9804172

(51) Int. Cl.⁷ .................................................. F16M 1/00
(52) U.S. Cl. ....................................... 248/672; 248/674
(58) Field of Search ................................. 248/672, 673, 248/674, 675, 677, 678, 637; 474/113

(56) References Cited

U.S. PATENT DOCUMENTS

| | | | |
|---|---|---|---|
| 3,803,434 A | | 4/1974 | Tamatsukuri |
| 5,317,424 A | | 5/1994 | Aotani |
| 5,718,407 A | * | 2/1998 | Lee .............................. 248/634 |
| 5,752,688 A | * | 5/1998 | Campbell et al. ............ 248/674 |
| 5,938,169 A | * | 8/1999 | Ogawa et al. ............... 248/674 |
| 6,304,016 B1 | * | 10/2001 | Frederick et al. ........ 248/674 X |

FOREIGN PATENT DOCUMENTS

| | | |
|---|---|---|
| DE | 1801104 | 4/1970 |
| DE | 3242864 C1 | 6/1984 |
| GB | 415421 | 8/1934 |
| GB | 710018 | 6/1954 |
| GB | 1405928 | 9/1975 |

\* cited by examiner

*Primary Examiner*—Ramon O. Ramirez
(74) *Attorney, Agent, or Firm*—Young & Thompson

(57) ABSTRACT

The housing support includes a support member, at least one location zone on a housing for receiving the support member, two spaced apart connectors for securing the support member to the housing at the location zone and two recesses. One recess is formed in the location zone and the other in the support member, whereby when the support member is secured to the location zone by the connectors the recesses face one another and define a chamber positioned between the connectors. A key is located in the chamber for receiving some of the forces which otherwise would be received by the connectors.

6 Claims, 4 Drawing Sheets

HOUSING SUPPORT

FIELD OF THE INVENTION

This invention relates to a housing support and particularly to the support of a housing containing a rotatable device such as an electric motor.

Such a housing needs to be suitably located and is often supported upon a horizontal surface. However, sometimes the housing needs to be supported in other locations e.g. under a horizontal surface or against a vertical surface, and the housing support has to be suitable for these other locations.

BACKGROUND OF THE INVENTION

Conventionally, bolts have been used as the main components of the housing support, but whilst these are suitable for supporting static loads, if the housing contains a rotatable device, dynamic forces acting in various directions are created and these cause the housing to move and sometimes the bolts to break. Although it is possible to prevent this breakage by using more expensive and stronger bolts, the undue movement of the housing is difficult to prevent merely by using the stronger bolts.

DE-A-322242864 discloses a housing support connected to a housing containing a rotatable electrical machine by means of bolts.

DE-A-1801104 discloses a housing support for a housing containing a rotatable electrical machine, the support comprising a support member, a location zone on the housing for receiving the support member, two spaced-apart connecting means for securing the support member to the housing at the location zone, and two recesses, one formed in the location zone and the other in the support member, whereby when the support member is secured to the location zone by means of the connecting means, the recesses face one another and define a chamber positioned between the connecting means, a key being located in the chamber for receiving some of the forces which would otherwise be received by the connecting means.

It is an object of the present invention to provide an improved housing support which does not suffer from or suffers less from the aforementioned disadvantages.

SUMMARY OF THE INVENTION

In accordance with the invention a housing support for a housing containing a rotatable device comprises a support member, a location zone on the housing for receiving the support member, two spaced-apart connecting means for securing the support member to the housing at the location zone, and two recesses, one formed in the location zone and the other in the support member, whereby when the support member is secured to the location zone by means of the connecting means, the recesses face one another and define a chamber positioned between the connecting means, a key being located in the chamber for receiving some of the forces which would otherwise be received by the connecting means characterised in that the chamber formed by the recesses and the key are elongated in a direction parallel to the rotational axis of the device.

Preferably the connecting means comprises a screw-threaded bolt which is capable of being positioned in a smooth-sided hole in the support member and received in a screw-threaded bore in the zone.

Preferably the recess in the zone is elongated and has a longer axis which is in line with the centers of the bores and the recess in the support member is similarly elongated and has a longer axis which is in line with the centers of the holes.

BREIF DESCRIPTION OF THE DRAWINGS

One embodiment of the invention will now be described by way of example only with reference to the accompanying drawings of which:

Figure 1:
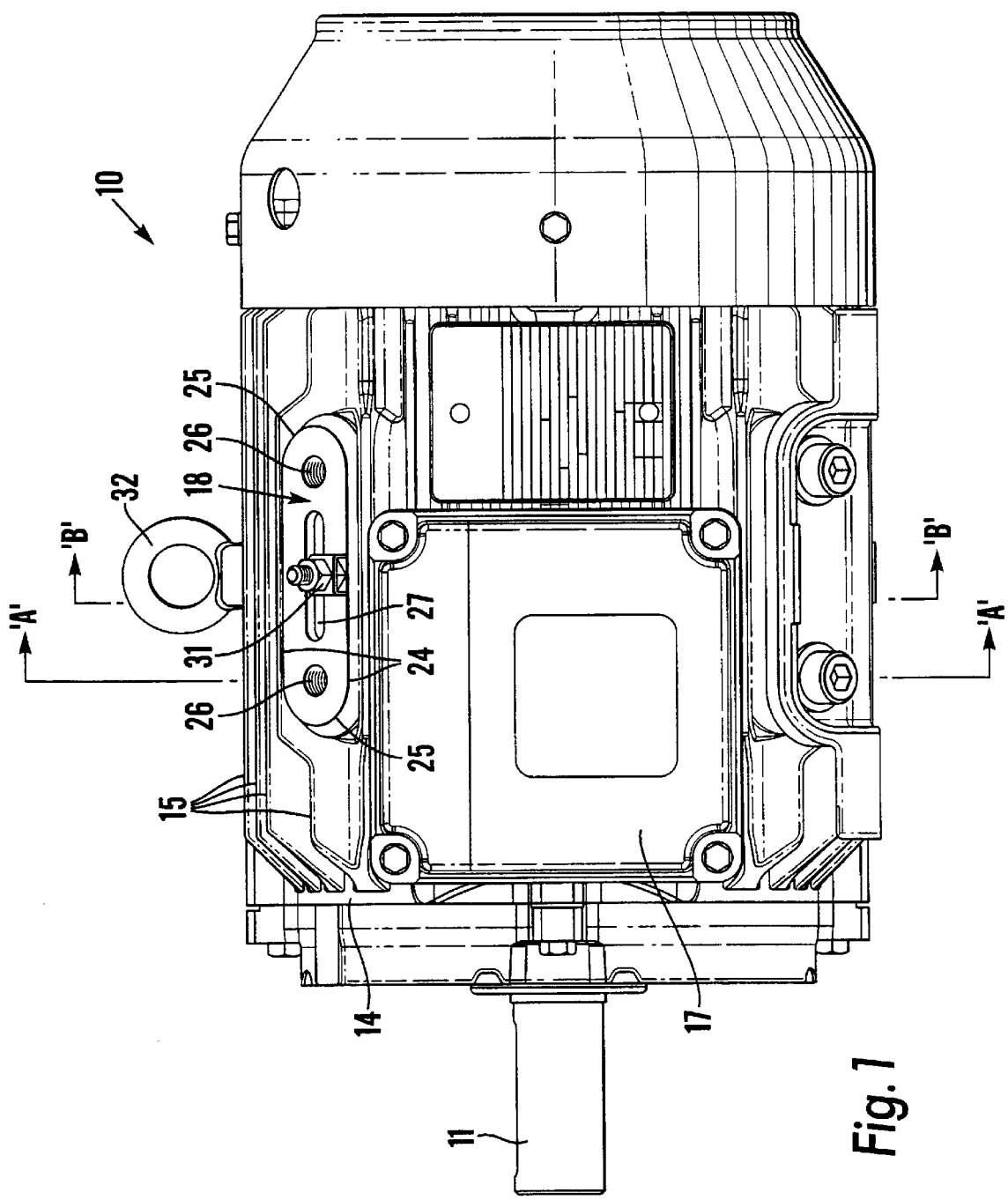
FIG. 1 shows a part sectional part side view of an electric motor in a housing having a support according to the invention.
Figure 2:
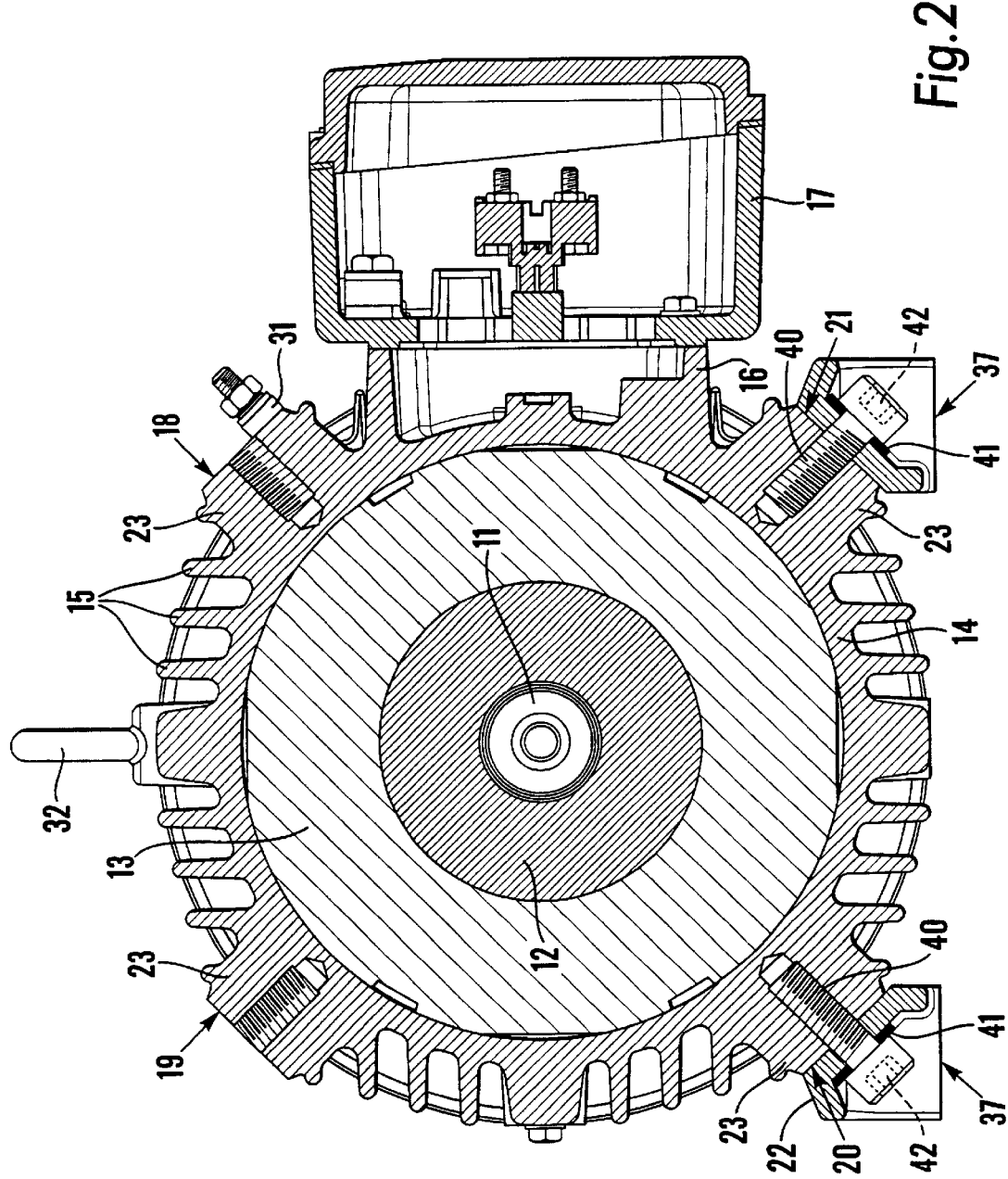
FIG. 2 shows a cross-section on line A—A of FIG. 1.
Figure 3:
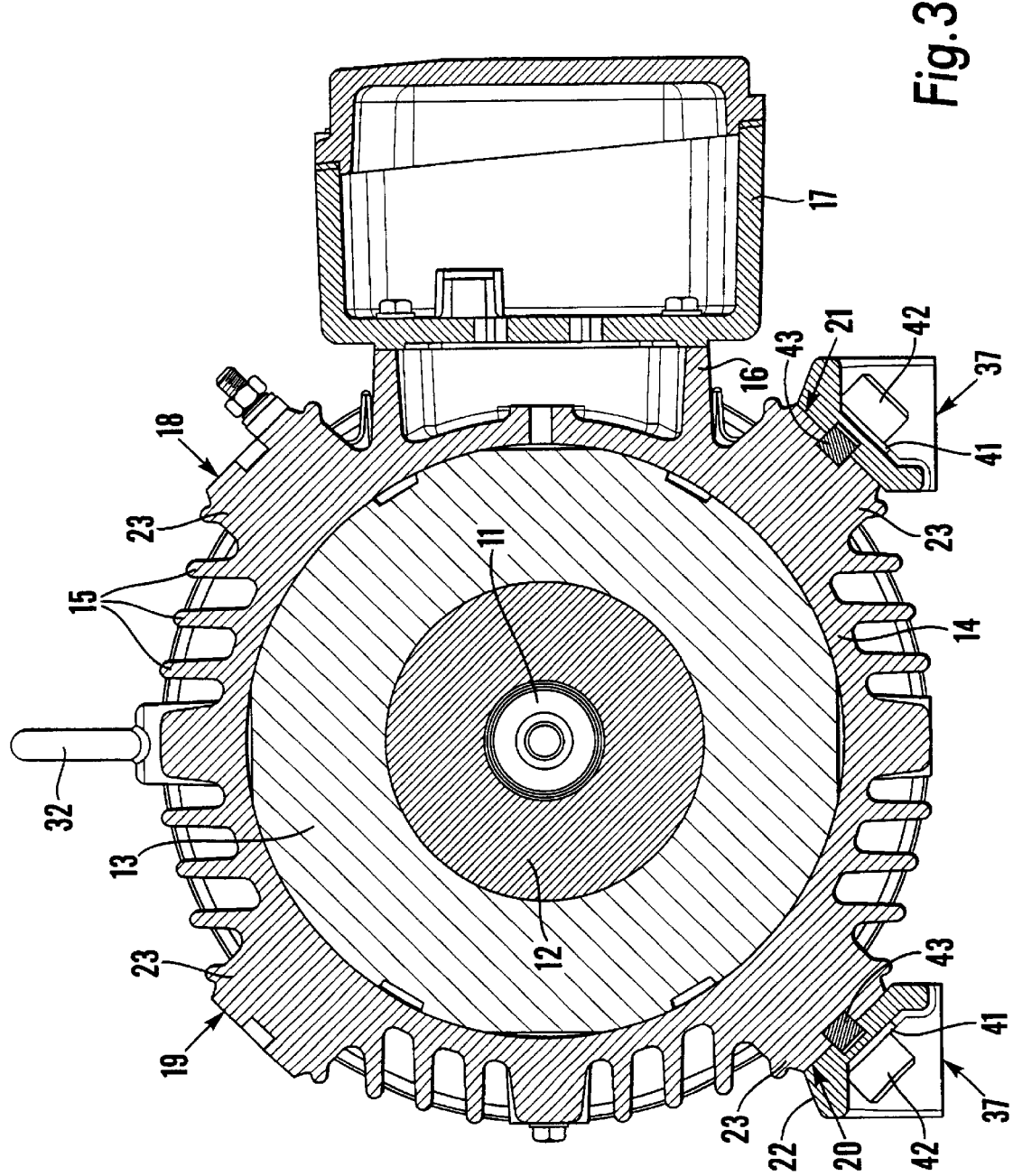
FIG. 3 shows a cross-section on line B—B of FIG. 1.

As shown in FIGS. 1, 2 and 3 an electric motor 10 consisting of a shaft 11, rotor 12 and stator 13 is contained within a generally cylindrical housing 14 of cast iron, the motor shaft 11 and housing 14 being coaxial. The exterior of the housing is formed with a plurality of cooling fins 15, a portion 16 for receiving a terminal box 17 and four location zones 18, 19,20,21 each for receiving a supporting member 22. Each location zone is located on the outer surface of a thickened portion 23 of the housing wall (see FIGS. 2 and 3).

Figure 4:
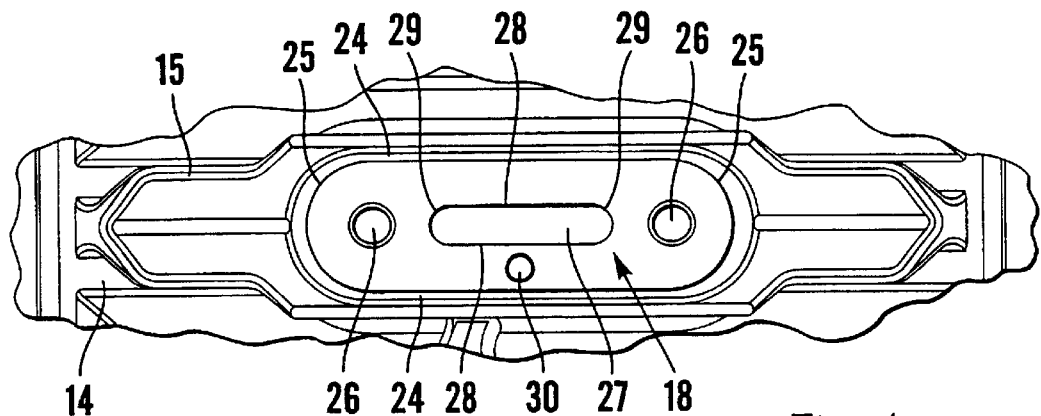
FIG. 4 shows an enlarged plan view of a location zone on the housing shown in FIG. 1.

Each location zone such as 18, shown in FIG. 4, comprises a machined elongated flat area having a boundary consisting of two parallel sides 24 and two semi circular ends 25. Two internally screw-threaded bores 26 are provided in the zone, extending into the housing wall. Each bore 26 is centered on the same center as each of the two semi-circular ends 25.

Located between the bores in each zone is a machined closed profile keyway 27 having two parallel sides 28 parallel to the parallel sides 24 of the zone boundary and two semi-circular ends 29. The profile keyway 27 has a major axis which passes through the centers of the two bores 26 and is parallel to the axis 0—0 of the shaft 11.

The zones 18 and 21, both closest to the terminal box 17, are each provided with a third bore 30 for receiving an earthing terminal 31 when not in use as part of the housing support Only one zone is provided with such an earthing terminal; in this embodiment it is the zone referred to by numeral 18.

As can be seen particularly in FIGS. 2 and 3, the four zones 18, 19,20,21 are equally spaced-apart around the outside of the housing 14. Diagonally opposed zones 18, 20 and 19,21 are parallel to one another and adjacent zones such as 20,21 are perpendicular to one another. As shown, the two lower zones 20,21 are positioned in spaced-apart relationship at 45° to the horizontal.

Two support members 22 are provided, one at each lower zone, 20,21 to support the motor 10 and housing 14 on top of a flat horizontal surface (not shown). Alternatively the motor 10 and housing 14 could be secured to a vertical surface by means of support members 22 attached to the two zones 19, 20 on the left-hand as shown in FIGS. 2 and 3 or underneath a horizontal surface by means of support members 22 attached to two upper zones 18, 19. (In the last mentioned configuration, the eye 32 used for transporting the motor 10 and housing 14 by means of a crane or hoist would be removed). The four zones 18, 19, 20 and 21 may also be used to support the motor and housing in a ducting by means of pad mountings.

Figure 5:
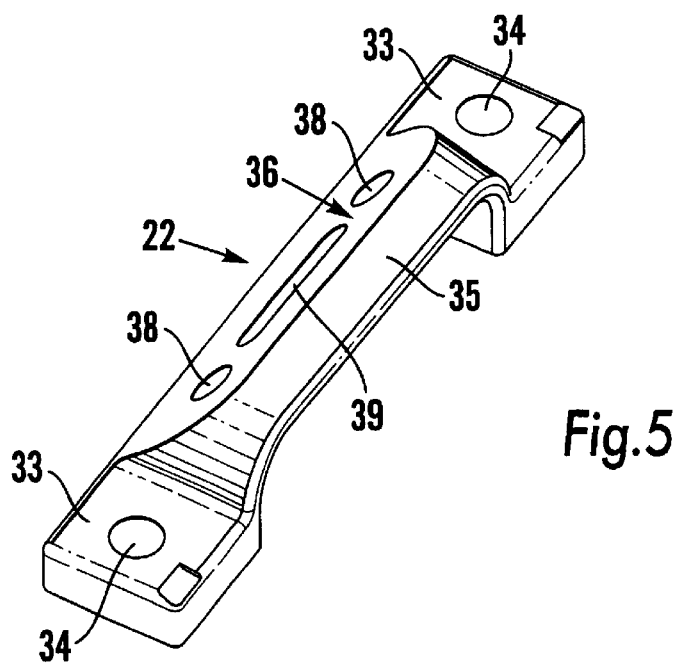
FIG. 5 shows an isometric view of a supporting member.
Figure 6:
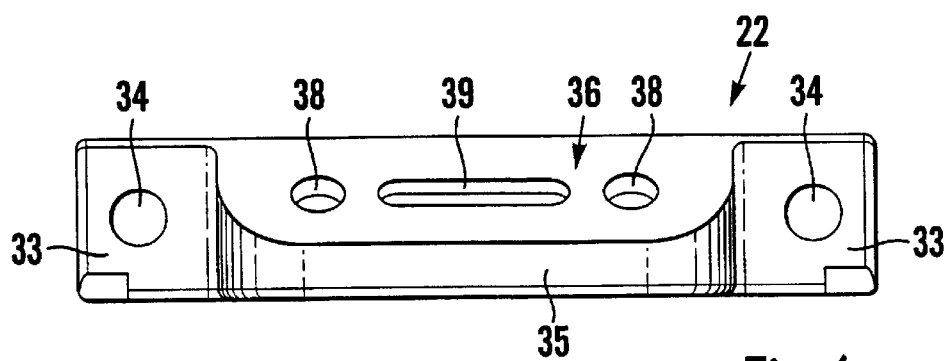
FIG. 6 shows a plan view of the supporting member shown in FIG. 5.

The support members 22, one of which is shown in detail in FIGS. 5 and 6, each comprise two end portions 33, each provided with smooth-sided holes 34 receiving a bolt 40 and an intermediate portion 35 having a surface 36 which is at 45° to the undersurfaces 37 (see FIGS. 2 and 3) of the end portions 33. The surface 36 of the intermediate portion 35 will contact a zone 8,19,20 or 21 on the housing as shown, especially in FIGS. 2 and 3. The intermediate portion 35 has two smooth-sided holes 38 to receive bolts and positioned to be in alignment with the screw-threaded bores 26 in the zone 18, 19, 20 or 21 and an intermediate profile keyway 39 matching and positioned to be in alignment with the keyway 27 in the zone 18, 19, 20 or 21 when secured thereto.

As can be seen in FIGS. 1, 2 and 3, two support members 22 are secured one to each of the two lower zones 20 or 21 by means of two hexagon headed bolts 40, spring washers 41 being positioned beneath the bolt heads 42. A key 43 is accurately dimensioned to fit in the chamber formed by the two keyways 27 and 39, one in a zone 20 or 21 and the other in the intermediate section 35 of the supporting member 22 secured thereto. The two supporting members 22 are secured by bolts (not shown) inserted into the holes in the end sections 33 on to a horizontal surface not shown in the drawings.

It is found that in use the keys 43 eliminate or substantially prevent any axial or radial movement arising from rotation of the motor.

What is claimed is:

1. A housing support for a housing containing a rotatable device, the housing support comprising:

a support member;

a location zone on the housing for receiving the support member;

two spaced-apart connecting means for securing the support member to the housing at the location zone;

two recesses, one recess formed in the location zone and the other recess formed in the support member whereby when the support member is secured to the location zone by means of the connecting means the recesses face one another and define a chamber, the chamber being interposed between the two connecting means; and a key being located in the chamber for receiving some of the forces which would otherwise be received by the connecting means, the chamber formed by the recesses and the key being elongated in a direction parallel to the rotational axis of the device.

2. The housing support according to claim 1, wherein the housing is generally cylindrical in form and four locating zones, each comprising a flat surface, are provided, equally spaced-apart around the generally cylindrical housing.

3. The housing support according to claim 2, wherein opposing location zones are parallel to one another and adjacent location zones are perpendicular to one another.

4. The housing support according to claim 1, wherein each of the connecting means comprises a screw-threaded bolt which is capable of being positioned in a smooth-sided hole in the support member and received in a screw-threaded bore in the location zone.

5. The housing support according to claim 4, wherein the recess in the location zone is elongated and has a longer axis which is in line with the centers of the bores and the recess in the support member is similarly elongated and has a longer axis which is in line with the centers of the holes.

6. The housing support according to claim 5, wherein the housing is for a rotatable device and the axes of the recesses are parallel to the rotational axis of the device.

* * * * *